(12) United States Patent
Cooley et al.

(10) Patent No.: US 9,016,405 B2
(45) Date of Patent: Apr. 28, 2015

(54) BEARING ASSEMBLIES, APPARATUSES, AND RELATED METHODS OF MANUFACTURE

(75) Inventors: Craig H. Cooley, Saratoga Springs, UT (US); Timothy N. Sexton, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 812 days.

(21) Appl. No.: 13/241,412

(22) Filed: Sep. 23, 2011

(65) Prior Publication Data

US 2012/0039551 A1    Feb. 16, 2012

Related U.S. Application Data

(63) Continuation-in-part of application No. 12/854,337, filed on Aug. 11, 2010, now Pat. No. 8,800,686.

(51) Int. Cl.
*F16C 33/02* (2006.01)
*F16C 17/02* (2006.01)
*F16C 17/04* (2006.01)

(52) U.S. Cl.
CPC .............. *F16C 17/02* (2013.01); *F16C 17/04* (2013.01); *F16C 2206/00* (2013.01)

(58) Field of Classification Search
CPC .. F16C 33/043; F16C 2352/00; F16C 17/065; F16C 43/02; F16C 17/035; F16C 33/106; F16C 33/1065; F16C 33/107; F16C 33/108; F16C 2202/22; F16C 27/08; E21B 4/003; E21B 10/22; E21B 10/23
USPC ............. 175/371, 320, 337; 384/97, 284, 285
See application file for complete search history.

(56) References Cited

U.S. PATENT DOCUMENTS

| | | | |
|---|---|---|---|
| 3,597,027 A | 8/1971 | Herndon | |
| 3,837,718 A | 9/1974 | Nattefort | |
| 4,141,605 A * | 2/1979 | Riordan et al. | ............... 384/223 |
| 4,227,753 A | 10/1980 | Wilcock | |
| 4,437,215 A | 3/1984 | Nozue et al. | |
| 4,560,014 A | 12/1985 | Geczy | |

(Continued)

FOREIGN PATENT DOCUMENTS

| | | |
|---|---|---|
| EP | 0543461 | 5/1993 |
| EP | 0595630 | 5/1994 |

(Continued)

OTHER PUBLICATIONS

U.S. Appl. No. 12/854,337, Oct. 1, 2013, Advisory Action.

(Continued)

*Primary Examiner* — Kenneth L Thompson
*Assistant Examiner* — Kipp Wallace
(74) *Attorney, Agent, or Firm* — Dorsey & Whitney LLP

(57) ABSTRACT

In an embodiment, a bearing assembly may include a support ring to which one or more superhard bearing elements may be mounted. The support ring may include one or more relief features configured to reduce residual stresses in the superhard bearing elements that are induced by brazing the superhard bearing elements to the support ring, operational loads, other processes, or combinations of the foregoing. Reducing the residual stresses in the superhard bearing elements may help prevent damage to the superhard bearing elements. The bearing assembly may be used in subterranean drilling systems and/or other types of systems.

25 Claims, 10 Drawing Sheets

(56) References Cited

U.S. PATENT DOCUMENTS

| | | | |
|---|---|---|---|
| 4,732,491 A | | 3/1988 | Geczy |
| 4,854,401 A | | 8/1989 | Kruger et al. |
| 5,043,796 A | * | 8/1991 | Lester .......................... 257/717 |
| 5,364,192 A | * | 11/1994 | Damm et al. ................ 384/420 |
| 5,366,298 A | | 11/1994 | Toshimitsu et al. |
| 5,660,481 A | | 8/1997 | Ide |
| 6,460,635 B1 | | 10/2002 | Kalsi et al. |
| 6,461,129 B2 | | 10/2002 | Liu |
| 7,842,111 B1 | | 11/2010 | Sani |
| 7,866,418 B2 | | 1/2011 | Bertagnolli et al. |
| 7,901,137 B1 | | 3/2011 | Peterson |
| 2004/0190804 A1 | | 9/2004 | John et al. |
| 2008/0035246 A1 | | 2/2008 | Kawamura et al. |
| 2010/0218995 A1 | | 9/2010 | Sexton et al. |
| 2010/0237621 A1 | * | 9/2010 | Tessier et al. .................... 290/52 |
| 2011/0197703 A1 | * | 8/2011 | Badre-Alam et al. ....... 74/574.1 |

FOREIGN PATENT DOCUMENTS

| | | |
|---|---|---|
| GB | 1392245 | 4/1975 |
| WO | WO 2009/015338 | 1/2009 |

OTHER PUBLICATIONS

U.S. Appl. No. 12/854,337, Apr. 8, 2014, Notice of Allowance.
U.S. Appl. No. 13/070,633, Oct. 16, 2013, Office Action.
U.S. Appl. No. 13/070,633, Mar. 7, 2014, Notice of Allowance.
U.S. Appl. No. 12/854,337, May 7, 2013, Office Action.
U.S. Appl. No. 12/854,337, filed Aug. 11, 2010, Sexton et al.
U.S. Appl. No. 13/070,633, filed Mar. 24, 2011, Sexton et al.
U.S. Appl. No. 11/545,929, filed Oct. 10, 2006, Bertagnolli et al.
International Search Report and Written Opinion from International Application No. PCT/US2011/044774 mailed Dec. 13, 2012.
International Search Report and Written Opinion from International Application No. PCT/US2012/056407 mailed Dec. 7, 2012.
U.S. Appl. No. 12/854,337, Nov. 19, 2012, Office Action.
U.S. Appl. No. 13/070,633, Jul. 1, 2013, Office Action.
U.S. Appl. No. 14/322,771, filed Jul. 2, 2014, Sexton et al.
U.S. Appl. No. 12/854,337, Jul. 23, 2014, Issue Notification.
U.S. Appl. No. 13/070,633, Jun. 30, 2014, Notice of Allowance.
U.S. Appl. No. 13/070,633, Jul. 9, 2014, Issue Notification.

* cited by examiner

US 9,016,405 B2

BEARING ASSEMBLIES, APPARATUSES, AND RELATED METHODS OF MANUFACTURE

CROSS-REFERENCE TO RELATED APPLICATIONS

This application is a continuation-in-part of U.S. application Ser. No. 12/854,337 filed on 11 Aug. 2010, the contents of which are incorporated herein, in their entirety, by this reference.

BACKGROUND

Subterranean drilling systems that employ downhole drilling motors are commonly used for drilling boreholes in the earth for oil and gas exploration. Subterranean drilling systems typically include a housing enclosing a downhole drilling motor operably connected to an output shaft. One or more thrust-bearing apparatuses may also be operably coupled to the downhole drilling motor for carrying thrust loads generated during drilling operations. A rotary drill bit may also be connected to the output shaft and be configured to engage a subterranean formation and drill a borehole. As the borehole is drilled with the rotary drill bit, pipe sections may be connected to the subterranean drilling system to form a drill string capable of progressively drilling the borehole to a greater size or depth within the earth.

Each bearing apparatus may include a stator that does not rotate and a rotor that is attached to the output shaft and rotates with the output shaft. The stator and rotor may each include a plurality of superhard bearing elements or inserts. Each superhard bearing element may be fabricated from a polycrystalline diamond compact ("PDC") that provides a bearing surface that bears against other bearing surfaces during use.

In a conventional PDC bearing apparatus, a bearing assembly may include a support ring that includes recesses configured to accept the superhard bearing elements. The superhard bearing elements may be partially disposed in the recesses of the support ring and secured partially therein via brazing or other processes. However, heating and/or cooling from brazing and other processes may generate significant residual stresses in the superhard bearing elements. These residual stresses alone and/or in combination with operational loads may cause fracturing and/or weakening of the superhard bearing elements which may result in failure of bearing assemblies and/or bearing apparatuses.

Therefore, manufacturers and users of bearing apparatuses continue to seek improved bearing assembly and apparatus designs and manufacturing techniques.

SUMMARY

Various embodiments of the invention relate to bearing assemblies and apparatuses that may include a support ring to which one or more superhard bearing elements may be secured. The support ring may include one or more relief features configured to reduce residual stresses formed in the superhard bearing elements by brazing the superhard bearing elements to the support ring, operational loads, or other processes. The various embodiments of the bearing assemblies and apparatuses may be used in subterranean drilling systems and/or other types of systems.

In an embodiment, a bearing assembly for use in a subterranean drilling system may include a plurality of superhard bearing elements and a support ring. The support ring may include a plurality of recesses distributed circumferentially about a rotation axis. A corresponding one of the plurality of superhard bearing elements may be affixed to the support ring in a corresponding one of the plurality of recesses. The bearing assembly may also include a plurality of relief features formed in the support ring. Each of the plurality of relief features may be disposed between adjacent recesses of the plurality of recesses. In an embodiment, the plurality of relief features may be configured to reduce residual stresses in the plurality of superhard bearing elements caused by securing (e.g., brazing) the plurality of superhard bearing elements to the support ring.

In an embodiment, a bearing apparatus for use in a subterranean drilling system may include a first bearing assembly and a second bearing assembly. The first bearing assembly may include a plurality of first superhard bearing elements each of which may include a first bearing surface. The first bearing assembly may also include a support ring that may include a plurality of recesses distributed circumferentially about a rotation axis. A corresponding one of the plurality of first superhard bearing elements may be affixed to the support ring in a corresponding one of the plurality of recesses. The support ring may also include a plurality of relief features formed in the support ring. Each of the plurality of relief features may be disposed between adjacent recesses of the plurality of recesses. The second bearing assembly may include a plurality of second superhard bearing elements each of which may include a second bearing surface generally opposing the first bearing surfaces of the plurality of first superhard bearing elements. In an embodiment, the plurality of relief features may be configured to reduce residual stresses in the plurality of first superhard bearing elements caused by securing (e.g., brazing) the plurality of first superhard bearing elements to the support ring.

In an embodiment, a method for manufacturing a bearing assembly for use in a subterranean drilling system may include providing a support ring. The support ring may include a plurality of recesses distributed circumferentially about an axis. The support ring may also include a plurality of relief features formed in the support ring, and each of the relief features may be disposed between adjacent recesses of the plurality of recesses. The plurality of superhard bearing elements may be brazed to the support ring without forming cracks in at least a portion of the plurality of superhard bearing elements that extend generally perpendicular to the axis.

Other embodiments include applications utilizing the disclosed bearing assemblies in various types of drilling systems and other applications.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Figure 1A:
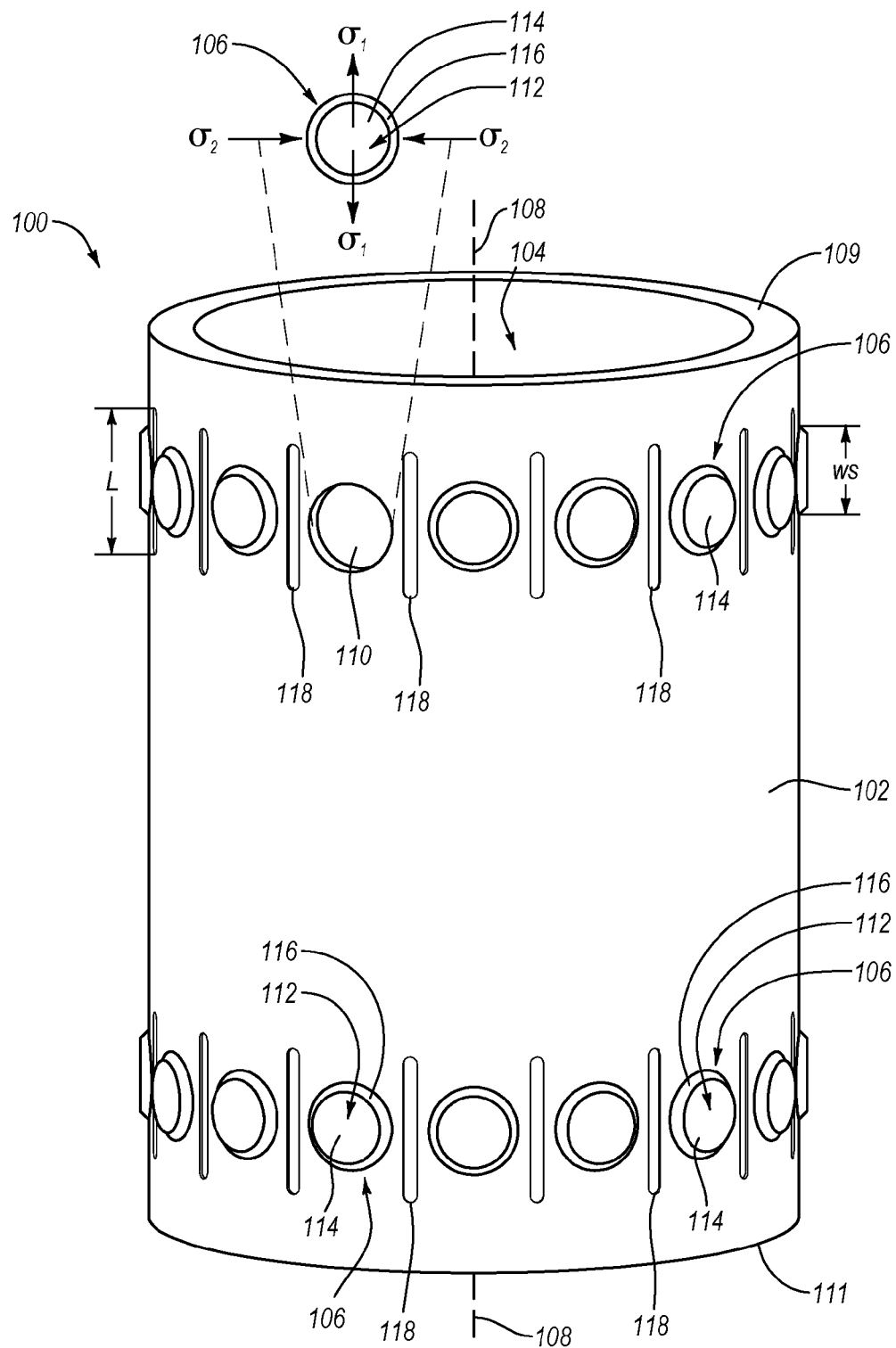
FIG. 1A is an isometric view of a radial bearing assembly according to an embodiment.

Embodiments of the invention relate to bearing assemblies, bearing apparatuses, and motor assemblies that include support rings having relief features configured to prolong the useful life of superhard bearing elements secured to the support rings. FIG. 1A is an isometric view of a radial bearing assembly 100 according to an embodiment. The radial bearing assembly 100 may form a stator or a rotor of a radial bearing apparatus used in a subterranean drilling system, a pump, a turbine, and/or other types of systems. The radial bearing assembly 100 may include a support ring 102 defining an opening 104 through which a shaft or spindle (not shown) of, for example, a drilling motor may extend. The support ring 102 may be made from a variety of different materials. For example, the support ring 102 may comprise carbon steel, stainless steel, tungsten carbide, or another suitable material.

The radial bearing assembly 100 further may include a plurality of superhard bearing elements 106. The plurality of superhard bearing elements 106 may be distributed about a rotation axis 108 in corresponding recesses 110 (see FIG. 1B) formed in the support ring 102 and arranged in a first row and a second row. In other embodiments, the superhard bearing elements 106 may be circumferentially distributed about the axis 108 in a single row, three rows, or any number of rows. The superhard bearing elements 106 may be generally cylindrical, generally non-cylindrical, generally rectangular, generally wedge shaped, or any other suitable configuration.

Some or all of the superhard bearing elements 106 may comprise a superhard table 112 including a convexly-curved bearing surface 114 (e.g., curved to lie on an imaginary cylindrical surface). In other embodiments, the bearing surfaces 114 may be concavely-curved or have other suitable shapes. Each superhard table 112 may be bonded or attached to a corresponding substrate 116. A portion of or all of the superhard bearing elements 106 may be partially secured in the recesses 110 via brazing, welding, soldering, press-fitting, fastening with a fastener, or another suitable technique. As used herein a "superhard bearing element" is a bearing element including a bearing surface that is made from a material exhibiting a hardness that is at least as hard as tungsten carbide.

In any of the embodiments disclosed herein, the superhard bearing elements 106 may be made from one or more superhard materials, such as polycrystalline diamond, polycrystalline cubic boron nitride, silicon carbide, tungsten carbide, or any combination of the foregoing superhard materials. For example, the superhard table may be formed from polycrystalline diamond and the substrate may be formed from cobalt-cemented tungsten carbide. Furthermore, in any of the embodiments disclosed herein, the polycrystalline diamond table may be leached to at least partially or substantially completely remove a metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be unleached and include a metal-solvent catalyst (e.g., cobalt, iron, nickel, or alloys thereof) that was used to initially sinter the precursor diamond particles that form the polycrystalline diamond or an infiltrant used to re-infiltrate a preformed leached polycrystalline diamond table. Other examples of methods for fabricating the superhard bearing elements are disclosed in U.S. Pat. Nos. 7,866,418, 7,842,111; and co-pending U.S. patent application Ser. No. 11/545,929, the disclosure of each of which is incorporated herein, in its entirety, by this reference.

The diamond particles that may form the polycrystalline diamond in the superhard table 112 may also exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation.

Additionally, in any of the embodiments disclosed herein, the superhard bearing elements 106 may be free-standing (e.g., substrateless) and formed from a polycrystalline diamond body that is at least partially or fully leached to remove a metal-solvent catalyst initially used to sinter the polycrystalline diamond body.

In the illustrated embodiment, the support ring 102 may include relief features (e.g., stress-relief features) configured to reduce residual stresses including compressive hoop stresses, tensile axial stresses, combinations thereof, and the like that may be induced in the superhard bearing elements 106 by securing the superhard bearing elements 106 to the support ring 102 by brazing or other method, operational loads, other processes, or combinations of the foregoing. For example, the superhard bearing elements 106 may be secured to the support ring 102 via a thermal process such as brazing. Brazing may cause the recesses 110 of the support ring 102 to expand and contract relative to the superhard bearing elements 106 because the support ring 102 generally has a coefficient of thermal expansion greater than that of the superhard bearing elements 106. When the recesses 110 contract, the recesses 110 of the support ring 102 may place compressive hoop stresses $\sigma_2$ on the superhard bearing elements 106. These compressive hoop stresses $\sigma_2$ may generate residual stresses in the superhard bearing elements 106 that can give rise to damage (e.g., tensile fracture) on the superhard bearing elements 106. More specifically, as shown in FIG. 1A, residual compressive hoop stresses a may induce axial tensile stresses $\sigma_1$ in the superhard bearing elements 106 that may damage the superhard bearing elements 106. Operational loads (not shown) may also add to the residual stresses within the superhard bearing elements 106 and cause failure that would otherwise not have occurred.

In an embodiment, one or more grooves 118 may be formed in the support ring 102 between adjacent (e.g., immediately adjacent) ones of the superhard bearing elements 106 and the recesses 110. The grooves 118 may be configured to help reduce the residual stresses in the superhard bearing elements 106 as a result of brazing the superhard bearing elements 106 to the support ring 102, operational loads, other processes, or combinations thereof. The grooves 118 may be configured to reduce the residual stresses in the superhard bearing elements 106 by functioning to at least partially segment the support ring 102 between the recesses 110 to lessen the clamping pressure on the superhard bearing elements 106 by making the support ring 102 more compliant (i.e., less stiff) in a circumferential direction. In other embodiments, the grooves 118 may be configured to reduce brazing-induced stresses in the superhard bearing elements 106 by functioning as expansion/contraction joints between the recesses 110 to compensate for thermal expansion and/or contraction of the recesses 110 relative to the superhard bearing elements 106. In yet other embodiments, the grooves 118 may be configured to function as heat dissipaters to attract energy in the form of heat away from the recesses 110 and the superhard bearing elements 106. More specifically, the grooves 118 may provide a larger heat dissipation surface area between the recesses 110 such that the temperature rise of the support ring 102 between the recesses 110 due to brazing, during use, or other processes is lower.

By reducing the residual stresses in the superhard bearing elements 106, the grooves 118 may reduce fracturing on the superhard bearing elements 106 and may advantageously help prolong the useful life of the superhard bearing elements 106.

Figure 1B:
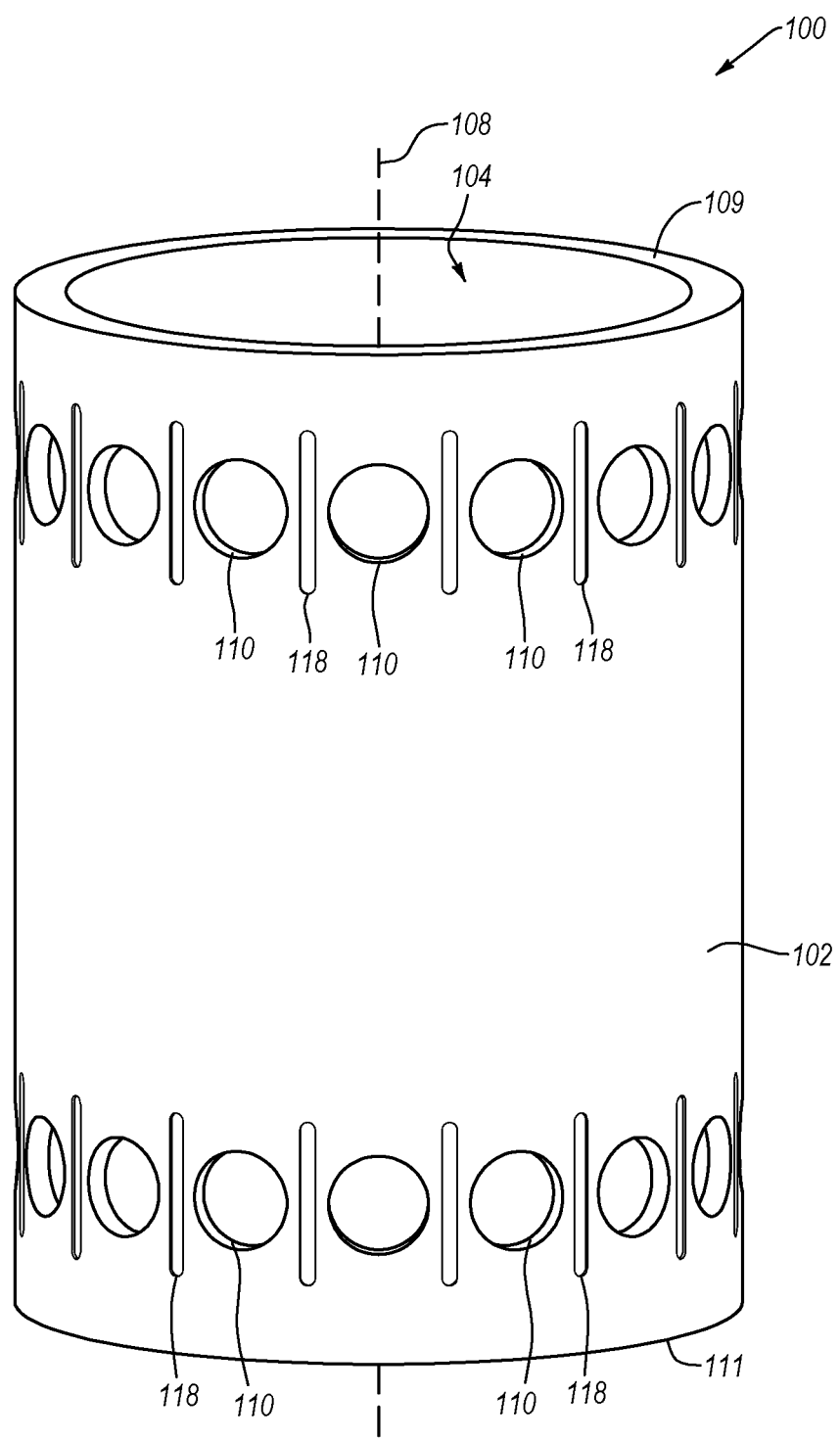
FIG. 1B is an isometric view of the radial bearing assembly shown in FIG. 1A with the superhard bearing elements removed.

As shown in FIGS. 1A and 1B, the grooves 118 may have a generally semi-cylindrical shape. While the grooves 118 are illustrated having a generally semi-cylindrical shape, the grooves 118 may have a generally rectangular shape, a generally crescent shape, a generally diamond shape, combinations thereof, or any other shape suitable to help reduce stresses in the superhard bearing elements 106. In the illustrated embodiment, the grooves 118 may have substantially the same configuration and shape. In other embodiments, the grooves 118 may have configurations and/or shapes that vary from one groove 118 to another groove 118. For example, a first one of the grooves 118 may have a generally diamond shape, a second one of the grooves 118 may have a generally semi-cylindrical shape, and a third one of the grooves 118 may have a generally rectangular shape.

Each of the grooves 118 may have a maximum length L as shown in FIG. 1A. The maximum length L of one or more of the grooves 118 may extend between opposite end portions of the grooves 118. In an embodiment, the maximum length L of at least one of the grooves 118 may be about 0.3 inches to about 1.5 inches, such as about 0.5 inches to about 0.8 inches. However, in other embodiments, the maximum length L of at least one of the grooves 118 may be longer or shorter than the foregoing ranges for the maximum length L. As illustrated, each of the grooves 118 may have at least substantially the same maximum length L. However, in other embodiments, some or all of the grooves 118 may have substantially different maximum lengths L. For example, in an embodiment, the support ring 102 may include a first group of grooves 118 having maximum lengths of about 1.2 inches and a second group of grooves 118 having maximum lengths of about 0.6 inches. In some embodiments, at least some of the grooves 118 may extend to an upper end surface 109 or a lower end surface 111.

In an embodiment, the relationship between the maximum length L of at least one the grooves 118 and a maximum width WR of at least one of the recesses (shown in FIG. 1C) may be configured to help reduce the stiffness of the support ring 102 during brazing and/or use. Increasing the maximum length L of the grooves 118 relative to the maximum width WR of the recesses 110 may increase the heat exchange surface between the grooves 118 and the recesses 110 and/or create greater expansion/contraction joints in the grooves 118 for the recesses 110. For example, the maximum length L of at least one of the grooves 118 may be at least: about ninety (90) percent; about one hundred (100) percent; about one hundred and ten (110) percent; about one hundred and twenty (120) percent; about one hundred and thirty (130) percent; about one hundred and forty (140) percent; or about one hundred and fifty (150) percent of the maximum width WR of the recesses 110. In other embodiments, the maximum length L of the grooves 118 may be about one hundred (100) percent to about one hundred and forty (140) percent; about one hundred and ten (110) percent to about one hundred and thirty (130) percent; or at least about one hundred and twenty (120) percent of the maximum width WR of at least one of the recesses 110. In other embodiments, the maximum length L of at least one of the grooves 118 and the maximum width WR of at least one of the recesses 110 may be larger or smaller relative to each other.

Similar to the relationship between the maximum length L of the grooves 118 and the maximum width WR of the recesses 110, the relationship between the maximum length L of at least one of the grooves 118 and a maximum width WS of at least one of the superhard bearing elements 106 (shown in FIG. 1A) may be configured to help reduce the residual stresses in the superhard bearing elements 106 that are brazed into support ring 102. For example, the maximum length L of at least one of the grooves 118 may be at least: about ninety (90) percent; about one hundred (100) percent; about one hundred and ten (110) percent; about one hundred and twenty (120) percent; about one hundred and thirty (130) percent; about one hundred and forty (140) percent; and/or about one hundred and fifty (150) percent of the maximum width WS of at least one of the superhard bearing elements 106. In other embodiments, the maximum length L of at least one of the grooves 118 may be between about one hundred (100) percent and about one hundred and forty (140) percent; or between about one hundred and ten (110) percent and about one hundred and thirty (130) percent, and/or about one hundred and twenty (120) percent of the maximum width WS of at least one of the superhard bearing elements 106. In other embodiments, the maximum length L of at least one of the grooves 118 and the maximum width WS of at least one of the superhard bearing elements 106 may be larger or smaller relative to each other.

Figure 1C:
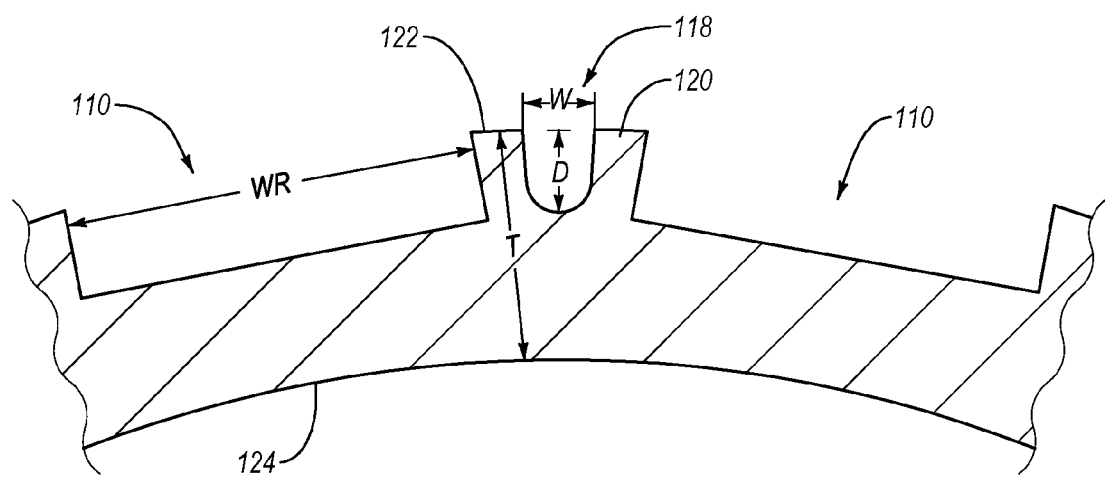
FIG. 1C is a cross-sectional view of the support ring shown in FIG. 1B.

Referring now to FIG. 1C, each of the grooves 118 may also include a maximum depth D and a maximum width W. Generally, the maximum depth D may extend only partially through the support ring 102 or completely through the support ring 102. For example, the maximum depth D may be about 0.1 inches to about 0.4 inches, such as about 0.15 inches to about 0.25 inches. Variations of the maximum depth D and/or the maximum width W of the grooves 118 may help the grooves 118 function as heat dissipaters, expansion/contraction joints, and/or to segment the support ring 102 to help reduce the stiffness and/or displacement of the support ring 102 during brazing and/or use.

As illustrated, the grooves 118 may be formed in a section of a wall 120 of the support ring 102. The wall 120 may have a thickness T that extends between an outer surface 122 and an inner surface 124. The maximum depth D of the grooves 118 may extend between the outer surface 122 of the wall 120 and a lower surface within the grooves 118, or the grooves 118 may extend completely through the wall 120 (i.e., through slots or grooves). As illustrated, the grooves 118 may have at least substantially the same maximum depth D. However, in other embodiments, some or all of the grooves 118 may have substantially different maximum depths D. In addition, the maximum depths D of the grooves 118 may vary. For example, at least one of the grooves 118 may have a maximum depth D that includes a deeper portion and a shallower portion.

In an embodiment, the relationship between the maximum depth D of at least one of the grooves 118 and the thickness T of the wall 120 may be configured to help reduce the residual stresses in the superhard bearing elements 106. For example, the maximum depth D of at least one of the grooves 118 may be about thirty (30) percent to about ninety (90) percent; about forty (40) percent to about eighty (80) percent; about fifty (50) percent to seventy (70) percent; about fifty-five (55) percent to about sixty-five (65) percent of the thickness T of the wall 120. In another embodiment, the depth D of at least one of the grooves 118 may be at least about forty (40) percent, at least about fifty (50) percent, at least about sixty (60) percent, about seventy (70) percent, or at least about eighty (80) percent of the thickness T of the wall 120. In other embodiments, the maximum depth D of the grooves 118 and the thickness T of the wall 120 may be larger or smaller relative to each other. For example, in an embodiment, the maximum depth D of the grooves 118 may extend entirely through the thickness T of the wall 120.

As shown in FIG. 1C, the maximum width W of each of the grooves may extend between opposing sidewalls of the grooves 118. In an embodiment, the maximum width W of at least one of the grooves 118 may be about 0.1 inches to about 0.3 inches, such as about 0.125 inches to about 0.2 inches. In other embodiments, the maximum widths W of at least one of the grooves 118 may be wider or narrower. As illustrated, the grooves 118 may have at least substantially the same maximum widths W. However, in other embodiments, some or all of the grooves 118 may have substantially different maximum widths W. In addition, the maximum widths W of the grooves 118 may vary. For example, at least one of the grooves 118 may have a maximum width W that includes a narrower portion and a wider portion.

In an embodiment, the relationship between the maximum width W of at least one of the grooves 118 and the maximum width WR of at least one of the recesses 110 may be configured to help reduce the stiffness and/or displacement of the support ring 102 during brazing or use. For example, the maximum width W of at least one of the grooves 118 may be at least: about ten (10) percent; about fifteen (15) percent; about twenty (20) percent; about twenty-five (25) percent; or about thirty (30) percent of the WR of the recesses 110. In addition, the maximum width of grooves 118 may be about ten (10) percent to about thirty (30) percent; or about fifteen (15) percent to about twenty-five (25) percent; or at least about twenty (20) percent of the maximum width WR of the recesses 110. In other embodiments, the maximum widths W of the grooves 118 and the maximum widths WR of the recesses 110 may be larger or smaller relative to each other.

In an embodiment, the relationship between the maximum width W of at least one of the grooves 118 and the maximum width WS of at least one of the superhard bearing elements 106 may be configured to help reduce the residual stresses due to brazing of the superhard bearing elements 106 into the support ring 102. For example, the maximum width W of at least one of the grooves 118 may be at least: about ten (10) percent; about fifteen (15) percent; about twenty (20) percent; about twenty-five (25) percent; or about thirty (30) percent of the maximum width WS of the superhard bearing elements 106. In addition, the maximum width W of at least one of the grooves 118 may be: about ten (10) percent to about thirty (30) percent; about fifteen (15) percent to about twenty-five (25) percent; or at least about twenty (20) percent of the maximum width WS of the superhard bearing elements 106. In other embodiments, the maximum widths W of the grooves 118 and the maximum widths WS of the superhard bearing elements 106 may be larger or smaller relative to each other.

In an embodiment, the relationship between the maximum length L and the maximum depth D of at least one of the grooves 118 may be configured to help reduce the stiffness or displacement of the support ring 102 during brazing or use. For example, the maximum length of at least one of the grooves 118 may be at least: about one hundred (100) percent; about two hundred (200) percent; about three hundred (300) percent; about four hundred (400) percent; about five hundred (500) percent; about six hundred (600) percent; about seven hundred (700) percent; or about eight hundred (800) percent of the maximum depth D of the groove 118. In addition, the maximum length L of at least one of the grooves 118 may be: about four hundred (400) percent to eight hundred (800) percent; or about five hundred (500) percent to seven hundred (700) percent of the maximum depth of the grooves 118; or about six hundred (600) percent of the maximum depth D of the groove 118. In other embodiments, the maximum depths D and the maximum lengths L of the grooves 118 may be larger or smaller relative to each other.

In an embodiment, the relationship between the maximum length L and the maximum width W of at least one of the grooves 118 may be configured to help reduce the stiffness or displacement of the support ring 102 during brazing or use. For example, the maximum length L of at least one of the grooves 118 may be at least: about one hundred (100) percent; about two hundred (200) percent; about three hundred (300) percent; about four hundred (400) percent; about five hundred (500) percent; about six hundred (600) percent; about seven hundred (700) percent; or about eight hundred (800) percent of the maximum width W. In addition, the maximum length L of at least one of the grooves 118 may be: about four hundred (400) percent to about eight hundred (800) percent; or about five hundred (500) percent to about seven hundred (700) percent; or at least about six hundred (600) percent of the maximum width W of the groove 118. In other embodiments, the maximum widths W and the maximum lengths L of the grooves 118 may be larger or smaller relative to each other.

In an embodiment, the relationship between the maximum depth D and the maximum width W of at least one of the grooves 118 may be configured to help reduce the stiffness or displacement of the support ring 102 during brazing or use. For example, the maximum depth D of at least one of the grooves 118 may be at least: about fifty (50) percent; about one hundred (100) percent; about one hundred and fifty (150) percent; about two hundred (200) percent; or about three hundred (300) percent of the maximum width W of the groove 118. In addition, the maximum depth D of at least one of the grooves 118 may be about fifty (50) percent to about one hundred and fifty (150) percent; or about one hundred (100) percent of the maximum width W the groove 118. In other configurations, the maximum depths D and the maximum widths W of the grooves 118 may be larger or smaller relative to each other.

Referring now to FIG. 1B, the grooves 118 may be disposed between adjacent (e.g., immediately adjacent) ones of the recesses 110 of the support ring 102. As shown, each of the grooves 118 may be disposed equidistantly between adjacent ones of the recesses 110 of the support ring 102. In other embodiments, the grooves 118 may be disposed closer to one of adjacent ones of the recesses 110. In other embodiments, two or more grooves 118 may be disposed between adjacent ones of the recesses 110. The grooves 118 may also be disposed between only some of the recesses 110. For example, the grooves 118 may be located between every other pair of adjacent ones of the recesses 110 of the support ring 102 or in any other configuration around the axis 108. The grooves 118 may also be positioned in various locations on the support ring 102. For example, the grooves 118 may be located above and/or below the recesses 110.

In an embodiment, the radial bearing assembly 100 may be manufactured by forming the recesses 110 and grooves 118 in the support ring 102. In other embodiments, the support ring 102 may be provided with the recesses 110 and/or the grooves 118 already formed therein. Thus, this step may be omitted. One or more filler metals may be placed in the recesses 110. The one or more filler metals may include brazing filler alloys or other suitable material. For example, one suitable brazing filler alloy is an alloy of about 50.0 weight % ("wt %") silver, about 20.0 wt % copper, about 28.0 wt % zinc, and about 2.0 wt % nickel, otherwise known as Braze 505 from Lucas-Milhaupt. Other suitable brazing filler alloys may include, but are not limited to, an alloy of about 4.5 wt % titanium, about 26.7 wt % copper, and about 68.8 wt % silver, otherwise known as TICUSIL®, and an alloy of about 25 wt % silver, about 37 wt % copper, about 10 wt % nickel, about 15 wt % palladium, and about 13 wt % manganese, otherwise known as PALNICUROM® 10. Both of the TICUSIL® and PALNICUROM® 10 braze alloys are currently commercially available from Wesgo Metals, Hayward, Calif.

The superhard bearing elements 106 may then be placed in the recesses 110 containing the one or more filler metals. The one or more filler metals, the superhard bearing elements 106, and the support ring 102 including the recesses 110 may then be subjected to a thermal process to bring the one or more filler metals slightly above their liquidus temperature (i.e., melting temperature) such that the one or more filler metals flow between the superhard bearing elements 106 and the recesses 110. The thermal process may include brazing, soldering, welding, or any other suitable thermal process. The one or more filler metals may then be cooled to solidify and join the superhard bearing element 106 and the recess 110 together, thereby securing the superhard bearing elements 106 to the support ring 102 with no or little fracturing of the superhard bearing elements 106. During the thermal process, the grooves 118 may help prevent damage to the superhard bearing elements 106 by functioning as expansion/contraction joints to help reduce any thermal expansion and/or contraction of the recesses 110. The grooves 118 may also help prevent damage to the superhard bearing elements 106 by reducing the stiffness of the support ring 102 during brazing or during use.

Any of the bearing assembly or bearing apparatus embodiments contemplated by the present invention may be manufactured according to the above described methods or similar methods.

Figure 2A:
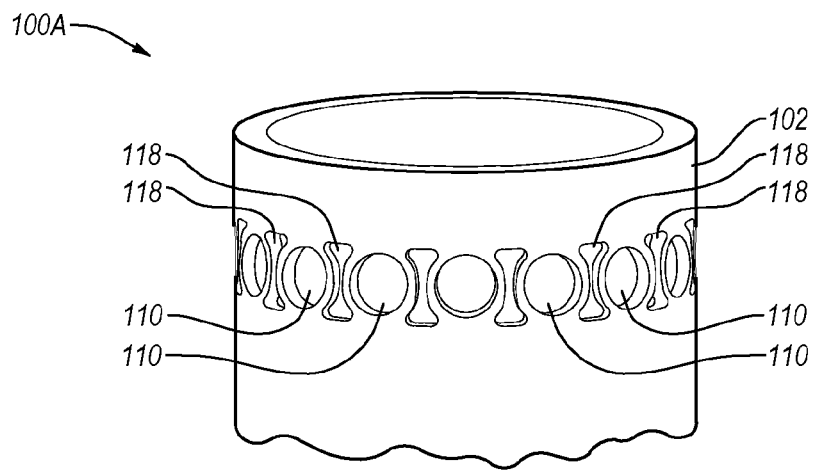
FIGS. 2A-2C are partial isometric views of radial bearing assemblies according to other embodiments.
Figure 2B:
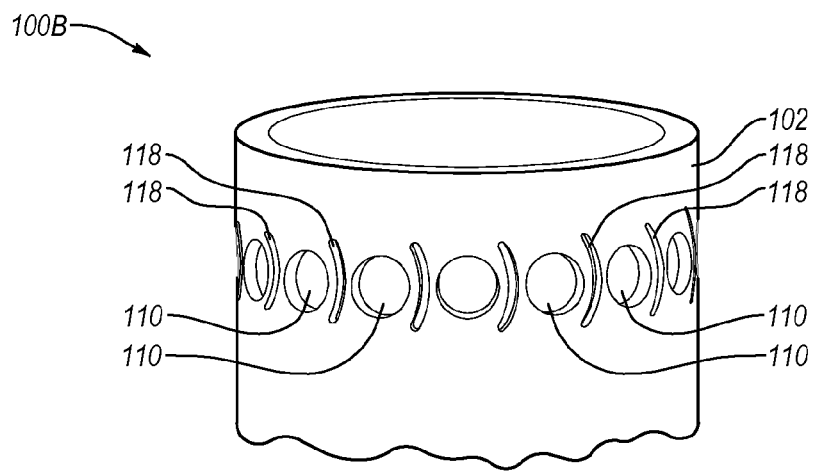
Figure 2C:
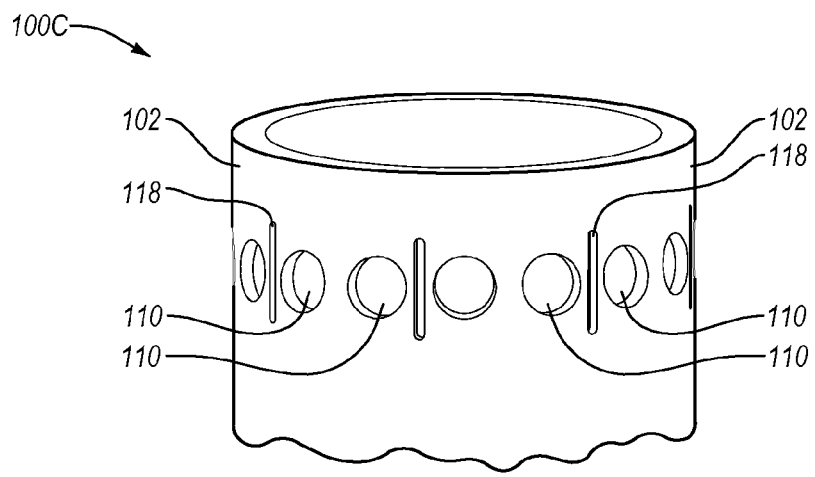

FIGS. 2A-2C are partial isometric views of radial bearing assemblies according to other embodiments. The radial bearing assemblies shown in FIGS. 2A-2C are similar in many respects to the radial bearing assembly 100 except for the configuration of the grooves 118. For ease of description, only the upper portions of the radial bearing assemblies are illustrated. As shown in FIG. 2A, radial bearing assembly 100A may include the support ring 102. The support ring 102 may include recesses 110 and grooves 118 having a generally hourglass shape. Each of the grooves 118 may be located between adjacent ones of the recesses 110. The hourglass shape of the grooves 118 may help reduce stresses formed in the superhard bearing elements 106 (shown in FIG. 1A) because a greater portion of the support ring 102 is removed between the recesses 110. The hourglass grooves 118 may also have a relatively large heat dissipation surface area.

In another embodiment, radial bearing assembly 100B may include the support ring 102. The support ring 102 may include recesses 110 and grooves 118 having a generally crescent shape as illustrated in FIG. 2B. Like the embodiment shown in FIG. 2A, each of the grooves 118 may be located between adjacent ones of the recesses 110. The generally crescent grooves 118 may be located above, below, and/or between the recesses 110. The generally crescent shape of the grooves 118 may help reduce brazing stresses formed in the superhard bearing elements 106 by allowing the grooves 118 to extend around a portion of a perimeter of the recesses 110. Hence, the generally crescent grooves 118 may effectively decrease the stiffness of the support ring 102 and/or provide expansion/contraction joints between the recesses 110 that at least partially encompass the recesses 110.

In yet another embodiment, radial bearing assembly 100C may include the support ring 102. The support ring 102 may include the grooves 118 located between every other adjacent ones of the recesses 110 as shown in FIG. 2C. In other embodiments, the grooves 118 may be located between every third adjacent ones of the recesses 110 or a pair of grooves 118 may be located between adjacent ones of the recesses 110. In yet other embodiments, two or more grooves 118 may be located between adjacent ones of the recesses 110. Varying the location of the grooves 118 on the support ring 102 may help to selectively tailor forces, loads, stresses, or combinations thereof within the support ring 102.

Figure 3:
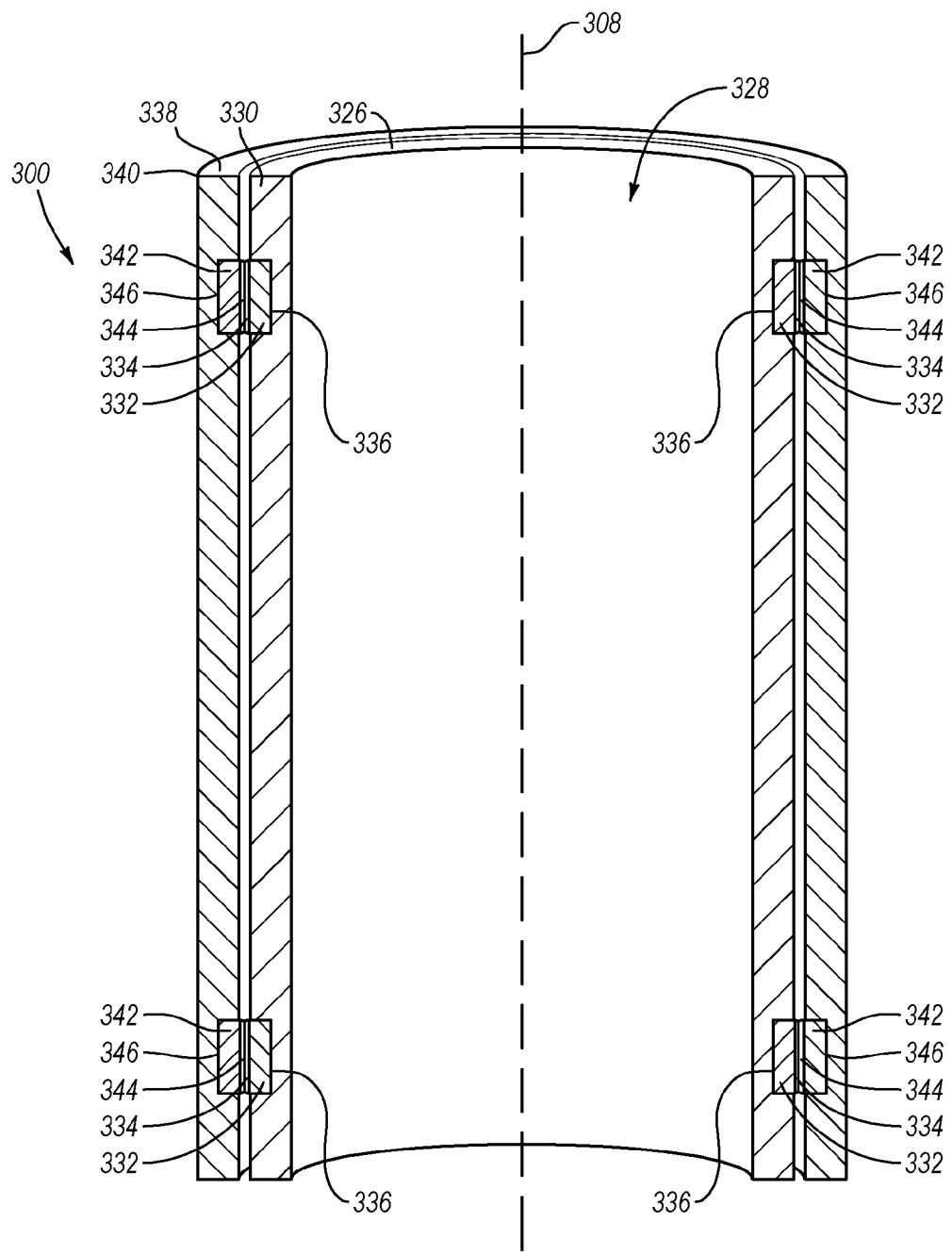
FIG. 3 is an isometric cutaway view of a radial bearing apparatus according to an embodiment.

Any of the above-described radial bearing assembly embodiments may be employed in a radial bearing apparatus. FIG. 3 is an isometric cutaway view of a radial bearing apparatus 300. The radial bearing apparatus 300 may include an inner race 326 (i.e., stator) configured as any of the previously described embodiments of radial bearing assemblies or any other radial bearing assemblies contemplated by the present invention. In an embodiment, the inner race 326 may define an opening 328. The inner race 326 may include a support ring 330 and a plurality of superhard bearing elements 332 distributed circumferentially about a rotation axis 308 in corresponding recesses 336 formed in the support ring 330. As shown, the recesses 336 may be arranged in a first row and a second row. In other embodiments, the recesses 336 may be circumferentially distributed in a single row, three rows, or any number of rows. Each of the superhard bearing elements 332 may include a convexly-curved bearing surface 334. The superhard bearing elements 332 may be made from any of the materials discussed above for the superhard bearing elements 106. One or more grooves (not shown) may be formed in the support ring 330 between adjacent ones of the superhard bearing elements 332 and/or the recesses 336. The grooves may be configured similar to the grooves 118 shown in FIGS. 1A-1C or any other groove contemplated by the present invention.

The radial bearing apparatus 300 may further include an outer race 338 (i.e., a rotor) that extends about and receives the inner race 326. The outer race 338 may include a support ring 340 and a plurality of superhard bearing elements 342 mounted or otherwise attached to the support ring 340. Each of the plurality of circumferentially-distributed superhard bearing elements 342 may include a concavely-curved bearing surface 344 curved to correspond to the convexly-curved bearing surfaces 334. The superhard bearing elements 342 may be made from any of the materials discussed above for the superhard bearing elements 106. The outer race 338 may also include recesses 346 formed in the support ring 340 that correspond to first and second rows of recesses 336 in the support ring 330 of the inner race 326. One or more grooves (not shown) may be formed in the support ring 340 between adjacent ones of the superhard bearing elements 342 and/or the recesses 346. The grooves may be configured similar to the grooves 118 shown in FIGS. 1A-1C or any other groove disclosed herein.

The terms "rotor" and "stator" refer to rotating and stationary components of the radial bearing apparatus 300, respectively. Thus, if the outer race 338 is configured to remain stationary, the outer race 338 may be referred to as the stator and the inner race 326 may be referred to as the rotor. One will appreciate that the radial bearing apparatus 300 may be employed in a variety of mechanical applications. For example, drill bits, pumps or turbines may benefit from a radial bearing apparatus disclosed herein.

Figure 4:
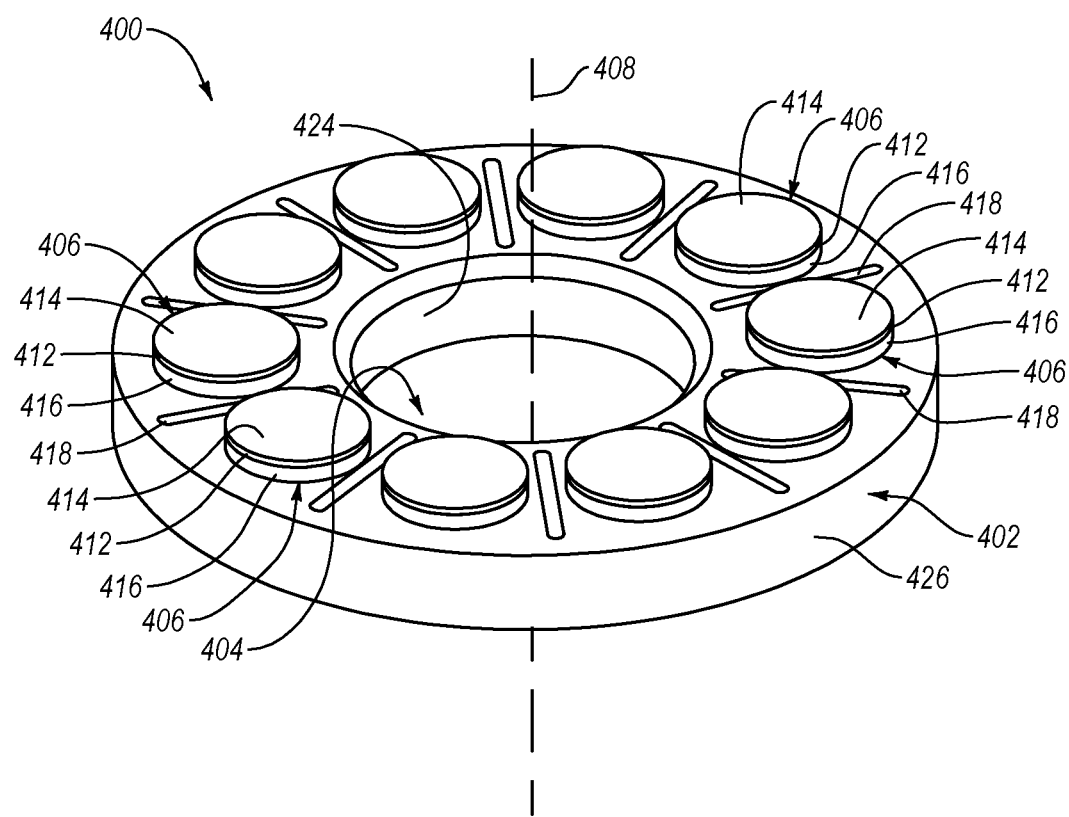
FIG. 4 is an isometric view of a thrust-bearing assembly according to an embodiment.

The concepts used in the radial bearing assemblies and apparatuses described above may also be employed in thrust-bearing assemblies and apparatuses. FIG. 4 is an isometric view of a thrust-bearing assembly 400 according to an embodiment. The thrust-bearing assembly 400 may form a stator or a rotor of a thrust-bearing apparatus used in a subterranean drilling system. As shown in FIG. 4, the thrust-bearing assembly 400 may include a support ring 402 defining an opening 404 through which a shaft (not shown) of, for example, a downhole drilling motor may extend. The support ring 402 may be made from a variety of different materials such as carbon steel, stainless steel, tungsten carbide, combinations thereof, or another suitable material. The thrust-bearing assembly 400 further may include a plurality of superhard bearing elements 406 and a plurality of recesses (not shown) formed in the support ring 402. The superhard bearing elements 406 may be partially disposed in a corresponding one of the recesses of the support ring 402 and secured partially therein via brazing, press-fitting, or another suitable technique.

The superhard bearing elements 406 are illustrated being distributed circumferentially about a thrust axis 408 along which a thrust force may be generally directed during use. Some of or all of the superhard bearing elements 406 may comprise a superhard table 412 including a bearing surface 414. Each superhard table 412 may be bonded or attached to a corresponding substrate 416. The superhard bearing elements 406 may each be made from any of the materials discussed above for the superhard bearing elements 106.

In the illustrated embodiment, the support ring 402 may also include relief features configured to help reduce the stiffness (i.e., increase compliance) of the support ring 402 during brazing or use. For example, the relief features may be configured to help reduce the compressive hoop stresses, the axial tensile stresses, other stresses, or combinations thereof formed in the superhard bearing elements 406 as a result of brazing the superhard bearing elements 406 to the support ring 402, operational loads, and/or other processes. In an embodiment, one or more grooves 418 may be formed in the support ring 402 between adjacent ones of the superhard bearing elements 406 and the recesses. The grooves 418 may be configured similar to grooves 118 or those described in relation to FIGS. 2A-2C, or any other groove contemplated by the present invention.

The grooves 418 may be configured to at least partially reduce the stiffness of the support ring 402, act as expansion/contraction joints between the recesses, act as heat dissipaters to draw energy away from the recesses, and the like. In an embodiment, the grooves 418 may have a generally semi-cylindrical shape. In other embodiments, the grooves 418 may have a generally rectangular shape, a generally crescent shape, a generally hourglass shape, a generally diamond shape, combinations thereof, or any other shape suitable to, for example, help reduce stresses in the superhard bearing elements 406.

In an embodiment, the grooves 418 may have substantially the same configuration and shape. In other embodiments, the grooves 418 may have configurations and/or shapes that vary from one groove 418 to another groove 418. For example, the grooves 418 may include a first group of grooves 418 having generally semi-cylindrical shapes and a second group of grooves 418 having generally hourglass shapes.

Referring still to FIG. 4, the grooves 418 may be positioned between each of the superhard bearing elements 406 of the support ring 402. In an embodiment, the grooves 418 may be located about equidistant between adjacent ones of the superhard bearing elements 406 of the support ring 402 or closer to one of the adjacent ones of the superhard bearing elements 406. In other embodiments, the grooves 418 may be positioned in other locations on the support ring 402. For example, the grooves 418 may be located above the superhard bearing elements 406, below the superhard bearing elements 406, and/or at any other suitable location on the support ring 402 to help reduce stresses in the superhard bearing elements 406. In addition, while a groove 418 is illustrated between each of the superhard bearing elements 406, the grooves 418 may be positioned between a selected some of the superhard bearing elements 406. For example, the grooves 418 may be absent between some of the adjacent ones of the superhard bearing elements 406 and included between others of the adjacent ones of the superhard bearing elements 406. In other embodiments, one or more of the grooves 418 may be disposed between every other pair of adjacent ones of the superhard bearing elements 406.

Figure 5:
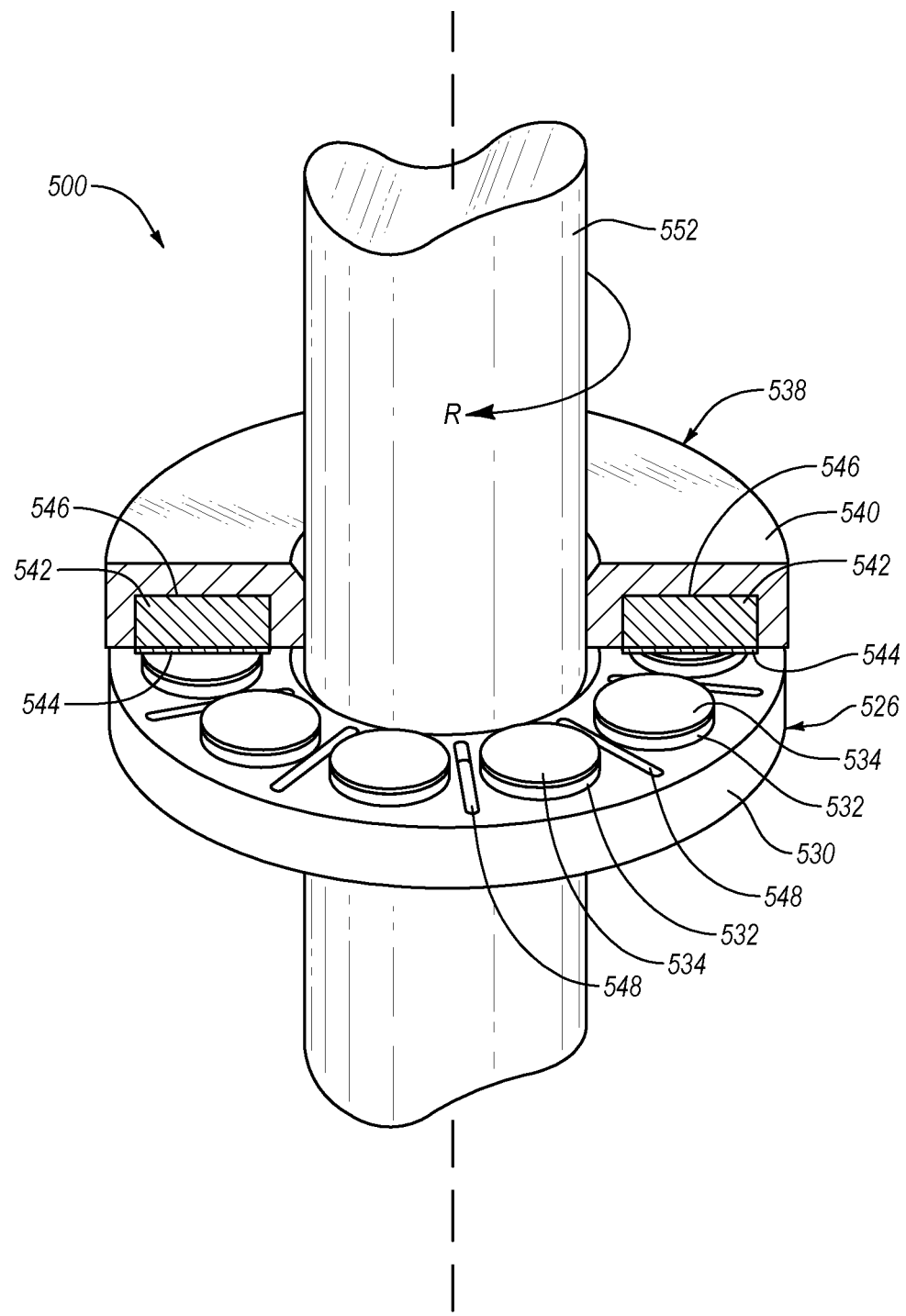
FIG. 5 is an isometric cutaway view of a thrust-bearing apparatus that may utilize any of the disclosed thrust-bearing assemblies according to an embodiment.

Any of the above-described thrust-bearing assembly embodiments may be employed in a thrust-bearing apparatus. FIG. 5 is a partial isometric cutaway view of a thrust-bearing apparatus 500. The thrust-bearing apparatus 500 may include a stator 526 configured as any of the previously described embodiments of thrust-bearing assemblies. The stator 526 may include a plurality of circumferentially-adjacent superhard bearing elements 532. At least some of or all of the superhard bearing elements 532 may include a bearing surface 534 and may exhibit, for example, the configuration described herein above relative to the superhard bearing elements 106. The superhard bearing element 532 may be mounted or otherwise attached to a support ring 530 in recesses (not shown). The support ring 530 may include grooves 548 formed between adjacent ones of the superhard bearing elements 532 and recesses. The grooves 548 may be configured as described herein above relative to the grooves 118 shown in FIGS. 1A-1C or any other groove contemplated by the present invention.

The thrust-bearing apparatus 500 may also include a rotor 538. The rotor 538 may include a support ring 540 having a plurality of recesses 546 and a plurality of superhard bearing elements 542, with each of the superhard bearing elements 542 having a bearing surface 544. A portion of or all of the superhard bearing elements 542 may be partially disposed in a corresponding one of the recesses 546 of the support ring 540 and secured partially therein via brazing or other suitable techniques. One or more grooves (not shown) may be formed in the support ring 540 between adjacent ones of the superhard bearing elements 542. The grooves of the support ring 540 may be configured similar to the grooves 118 shown in FIGS. 1A-1C or any other groove disclosed herein. As shown, a shaft 552 may be coupled to the support ring 540 and operably coupled to an apparatus capable of rotating the shaft 552 in direction R (or in a generally opposite direction), such as a downhole motor. For example, the shaft 552 may extend through and may be secured to the support ring 540 of the rotor 538 by press-fitting or threadly coupling the shaft 552 to the support ring 540 or another suitable technique.

Figure 6A:
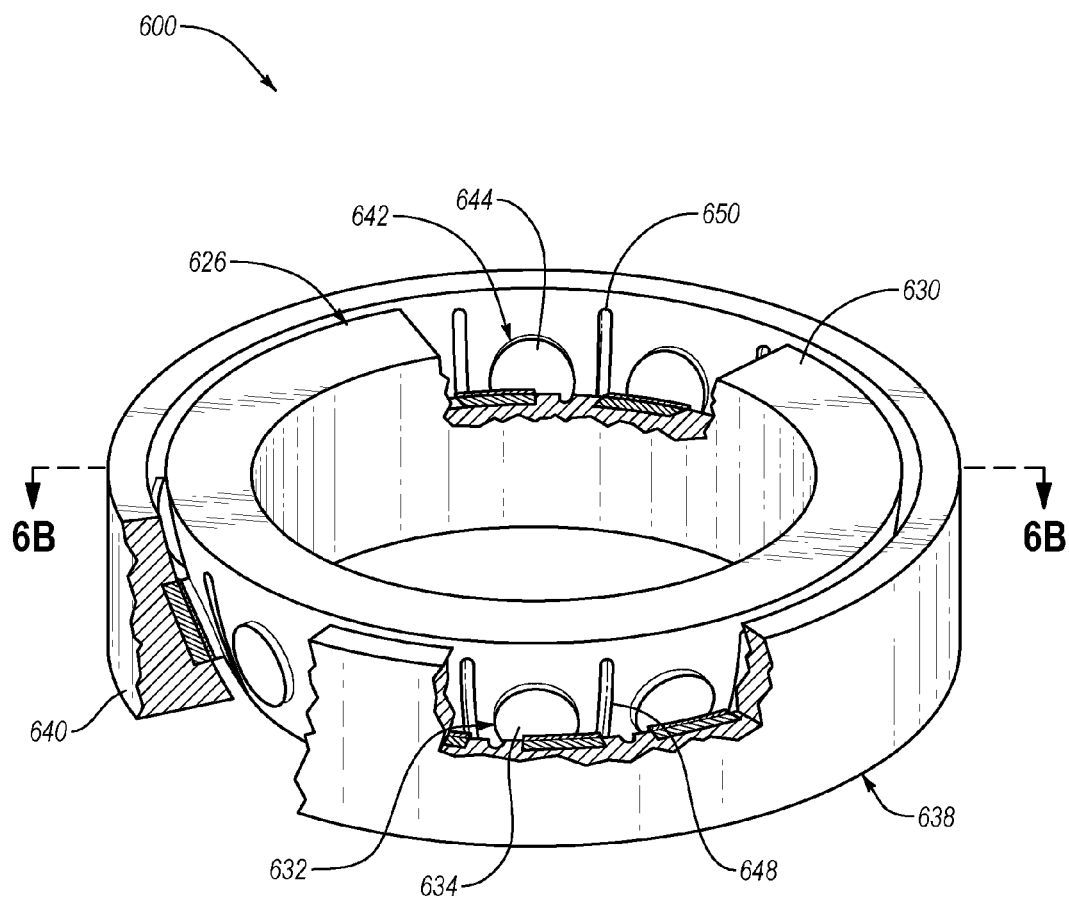
FIG. 6A is an isometric cutaway view of an angular contact bearing apparatus according to an embodiment.
Figure 6B:
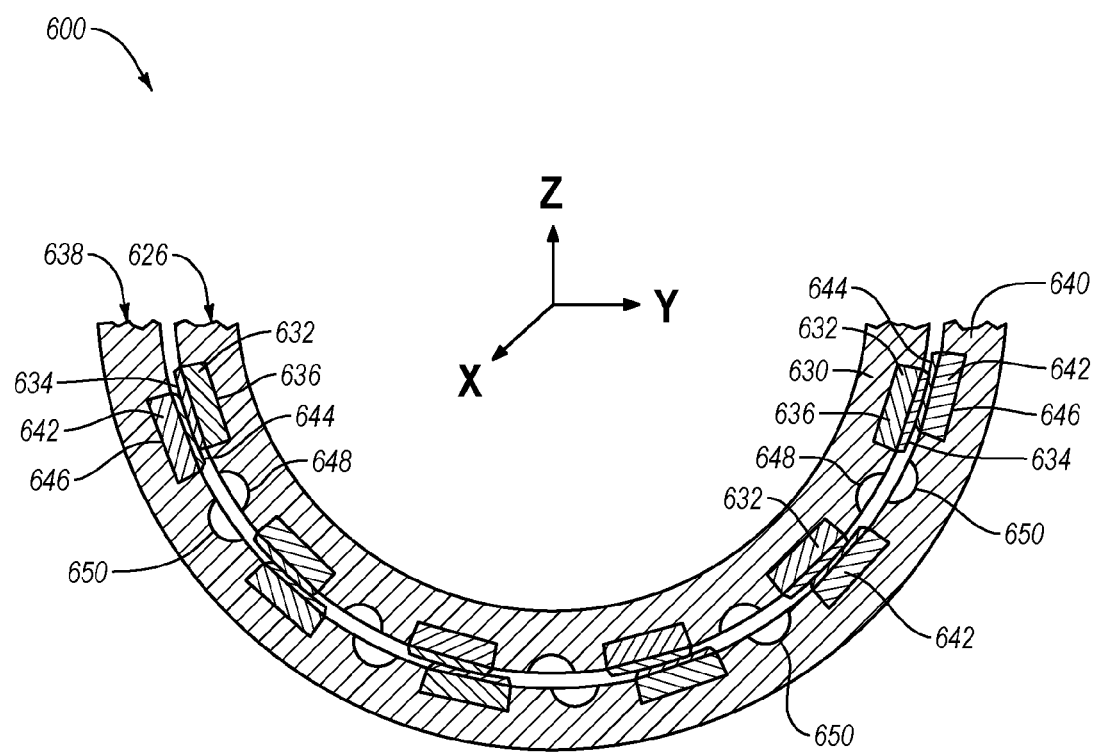
FIG. 6B is a partial cross-sectional view taken along line 6B-6B of the angular contact bearing apparatus shown in FIG. 6A.

The concepts used in the radial bearing assemblies and apparatuses and thrust-bearing assemblies and apparatuses described above may also be employed in angular contact bearing assemblies and apparatuses. For example, FIGS. 6A and 6B illustrate an angular contact bearing apparatus 600 that is configured to carry both radial loads and thrust loads. In an embodiment, the angular contact bearing apparatus 600 may include an inner race 626 and an outer race 638. The outer race 638 may receive the inner race 626, and the outer race 638 and the inner race 626 may be configured to move relative to each other. For example, the inner race 626 may be independently rotatable about three mutually orthogonal axes X, Y, and Z (shown in FIG. 6B) and connected to, for example, an output shaft of a motor and the outer race 638 may be stationary, or vice versa.

The inner race 626 may include a support ring 630 having a plurality of circumferentially-adjacent superhard bearing elements 632. The superhard bearing elements 632 may include a convexly-shaped bearing surface 634 that generally lies on an imaginary spherical reference surface and may be oriented to carry thrust and radial loads. The superhard bearing elements 632 may be mounted or otherwise attached to the support ring 630 at least partially within recesses 636 formed in the support ring 630. The support ring 630 may also include also grooves 648 formed between adjacent ones of the superhard bearing elements 632. The grooves 648 may be configured as described herein above in relation to the grooves 118 shown in FIGS. 1A-1C or any other groove disclosed herein.

As shown in FIGS. 6A and 6B, the outer race 638 may include a support ring 640 having a plurality of circumferentially-adjacent superhard bearing elements 642. The superhard bearing elements 642 may include a concavely-shaped bearing surface 644 that generally lies on an imaginary spherical reference surface and may be oriented to carry thrust and radial loads. The superhard bearing elements 642 may be mounted or otherwise attached to the support ring 640 at least partially within recesses 646 formed in the support ring 640. The support ring 640 may also include grooves 650 formed between adjacent ones of the superhard bearing elements 642. The grooves 650 may be configured as described herein above in relation to the grooves 118 shown in FIGS. 1A-1C or any other groove contemplated by the present invention.

While the grooves 648 and 650 are illustrated in FIGS. 6A and 6B having a generally cylindrical shape, the grooves 648 and 650 may have a generally rectangular shape, a generally crescent shape, a generally hourglass shape, a generally diamond shape, combinations thereof, or any other suitable shape to help reduce stresses in the superhard bearing elements 632, 642. In an embodiment, the grooves 648 and 650 may have substantially the same configuration and shape. In other embodiments, the grooves 648 and 650 may have configurations and/or shapes that vary between the grooves 648 and/or the grooves 650. In other embodiments, the grooves 648 and/or the grooves 650 may extend completely through the support rings 630 and 640, respectively, or may be located above, below, and or intermittently between the recesses 636, 646, respectively.

Figure 7:
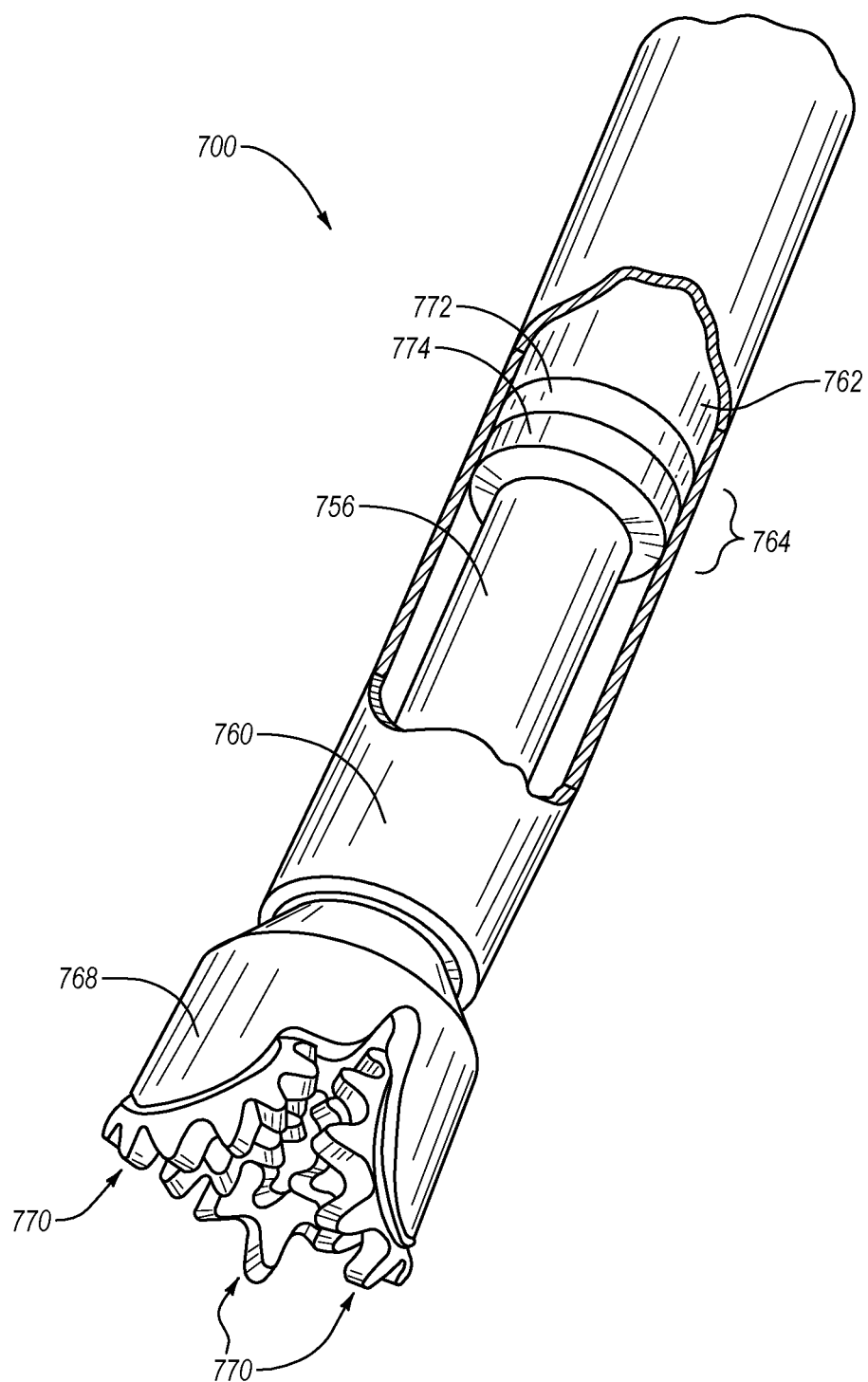
FIG. 7 is a schematic isometric cutaway view of a subterranean drilling system including a thrust-bearing apparatus utilizing any of the described bearing assemblies according to various embodiments.

Any of the embodiments for bearing apparatuses discussed above may be used in a subterranean drilling system. FIG. 7 is a schematic isometric cutaway view of a subterranean drilling system 700 according to an embodiment. The subterranean drilling system 700 may include a housing 760 enclosing a downhole drilling motor 762 (i.e., a motor, turbine, or any other device capable of rotating an output shaft) that may be operably connected to an output shaft 756. A thrust-bearing apparatus 764 may be operably coupled to the downhole drilling motor 762. The thrust-bearing apparatus 764 may be configured as any of the previously described thrust-bearing apparatus embodiments. A rotary drill bit 768 may be configured to engage a subterranean formation and drill a borehole and may be connected to the output shaft 756. The rotary drill bit 768 is shown as a roller cone bit including a plurality of roller cones 770. However, other embodiments may utilize different types of rotary drill bits, such as so-called "fixed cutter" drill bits. As the borehole is drilled, pipe sections may be connected to the subterranean drilling system 700 to form a drill string capable of progressively drilling the borehole to a greater depth within the earth.

The thrust-bearing apparatus 764 may include a stator 772 that does not rotate and a rotor 774 that may be attached to the output shaft 756 and rotates with the output shaft 756. As discussed above, the thrust-bearing apparatus 764 may be configured as any of the embodiments disclosed herein. For example, the stator 772 may include a plurality of circumferentially-distributed superhard bearing elements and grooves (not shown). The rotor 774 may include a plurality of circumferentially-distributed superhard bearing elements and grooves (not shown). The grooves in the rotor 774 and/or the stator 772 may be configured similar to the grooves 118 shown in FIGS. 1A-1C or any other groove contemplated by the present invention.

Although several of the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly for use in a subterranean drilling system, the bearing assembly comprising:
   a plurality of superhard bearing elements; and
   a support ring including:
      a plurality of recesses distributed circumferentially about a rotation axis, wherein a corresponding one of the plurality of superhard bearing elements is affixed to the support ring in a corresponding one of the plurality of recesses; and
      a plurality of relief features formed in the support ring including two closed ends that are bounded by the support ring, each of the plurality of relief features disposed between adjacent recesses of the plurality of recesses.

2. The bearing assembly of claim 1 wherein the plurality of relief features are configured to reduce residual stresses in the plurality of superhard bearing elements caused by brazing the plurality of superhard bearing elements to the support ring.

3. The bearing assembly of claim 1 wherein the plurality of superhard bearing elements are substantially equidistantly spaced apart.

4. The bearing assembly of claim 1 wherein at least a portion of the plurality of superhard bearing elements comprises polycrystalline diamond compacts.

5. The bearing assembly of claim 1 wherein the plurality of relief features comprises a plurality of grooves formed in the support ring.

6. The bearing assembly of claim 5 wherein each of the plurality of grooves is disposed between adjacent recesses of the plurality of recesses of the support ring.

7. The bearing assembly of claim 5 wherein each of the plurality of grooves is disposed circumferentially about halfway between adjacent recesses of the plurality of recesses of the support ring.

8. The bearing assembly of claim 5 wherein the plurality of grooves are substantially equidistantly spaced apart.

9. The bearing assembly of claim 5 wherein the plurality of grooves are formed in a section of a wall of the support ring, and wherein a maximum depth of at least one of the plurality of grooves is about thirty (30) percent to about ninety (90) percent of a maximum thickness of the support ring.

10. The bearing assembly of claim 9 wherein the maximum depth of the at least one of the plurality of grooves is about forty (40) percent to about eighty (80) percent of the maximum thickness of the support ring.

11. The bearing assembly of claim 9 wherein the maximum depth of the at least one of the plurality of grooves is about fifty (50) percent to about seventy (70) percent of the maximum thickness of the support ring.

12. The bearing assembly of claim 9 wherein the maximum depth of the at least one of the plurality of grooves is about fifty-five (55) percent to about sixty-five (65) percent of the maximum thickness of the support ring.

13. The bearing assembly of claim 9 wherein the maximum depth of the at least one of the plurality of grooves is about forty (40) percent to about eighty (80) percent of the maximum thickness of the support ring.

14. The bearing assembly of claim 5 wherein a maximum width of at least one of the plurality of grooves is about ten (10) percent to about thirty (30) percent of a maximum width of at least one of the plurality of recesses.

15. The bearing assembly of claim 14 wherein a maximum length of at least one of the plurality of grooves is about fifteen (15) percent to about twenty-five (25) percent of the maximum width of the at least one of the plurality of recesses.

16. The bearing assembly of claim 14 wherein a maximum length of at least one of the plurality of grooves is about one hundred (100) percent to about one hundred and forty (140) percent of the maximum width of the at least one of the plurality of recesses.

17. The bearing assembly of claim 5 wherein a maximum length of at least one of the plurality of grooves is at least about one hundred and twenty (120) percent of the maximum width of the at least one of the plurality of recesses.

18. The bearing assembly of claim 5 wherein at least some of the plurality of grooves extends entirely through a thickness of the support ring.

19. The bearing assembly of claim 1 wherein each of the superhard bearing elements comprises a superhard bearing surface that is substantially free of radially-extending cracks.

20. A bearing apparatus for use in a subterranean drilling system, the bearing apparatus comprising:
   a first bearing assembly including:
      a plurality of first superhard bearing elements each of which includes a first bearing surface; and
      a support ring including:
         a plurality of recesses distributed circumferentially about a rotation axis, wherein a corresponding one of the plurality of first superhard bearing elements that is affixed to the support ring in a corresponding one of the plurality of recesses; and
         a plurality of relief features formed in the support ring including two closed ends that are bounded by the support ring, each of the plurality of relief features disposed between adjacent recesses of the plurality of recesses; and
   a second bearing assembly including a plurality of second superhard bearing elements each of which includes a second bearing surface generally opposing the first bearing surfaces of the plurality of first superhard bearing elements.

21. The bearing apparatus of claim 20 wherein the plurality of relief features are configured to reduce residual stresses in the plurality of first superhard bearing elements caused by brazing the plurality of first superhard bearing elements to the support ring.

22. The bearing apparatus of claim 20 wherein the first and second bearing assemblies are each radial bearing assemblies.

23. The bearing apparatus of claim 20 wherein the first and second bearing assemblies are each thrust-bearing assemblies.

24. A method for manufacturing a bearing assembly for use in a subterranean drilling system, the method comprising:
   providing a support ring including:
      a plurality of recesses distributed circumferentially about an axis; and
      a plurality of relief features formed in the support ring including two closed ends that are bounded by the support ring, each of the plurality of relief features disposed between adjacent recesses of the plurality of recesses; and
   brazing a plurality of superhard bearing elements to the support ring, with each of the plurality of superhard bearing elements disposed in a corresponding one of the plurality of recesses.

25. The method of claim 24 wherein brazing a plurality of superhard bearing elements to the support ring comprises brazing the plurality of superhard bearing elements to the support ring without forming radial cracks in at least one of the plurality of superhard bearing elements.

* * * * *